United States Patent [19]
Arthurson

[11] Patent Number: 5,223,105
[45] Date of Patent: Jun. 29, 1993

[54] OZONE GENERATOR

[75] Inventor: Craig J. Arthurson, Church Point, Australia

[73] Assignee: Arthurson Corporation Pty. Ltd., New South Wales, Australia

[21] Appl. No.: 778,877

[22] PCT Filed: Jun. 29, 1990

[86] PCT No.: PCT/AU90/00280

§ 371 Date: Dec. 24, 1991

§ 102(e) Date: Dec. 24, 1991

[87] PCT Pub. No.: WO91/00242

PCT Pub. Date: Jan. 10, 1991

[30] Foreign Application Priority Data

Jun. 29, 1989 [AU] Australia ............... PJ 4998

[51] Int. Cl.⁵ .................. C01B 13/10; B01J 19/08; B01J 19/12
[52] U.S. Cl. ................. 204/176; 204/157.5; 422/186.07; 422/186.08
[58] Field of Search ............. 204/176, 157.5; 422/186.07, 186.08

[56] References Cited

U.S. PATENT DOCUMENTS

| | | | |
|---|---|---|---|
| 2,637,688 | 5/1953 | Ryan | 204/157.5 |
| 3,653,185 | 4/1972 | Scott et al. | 204/157.5 |
| 4,131,528 | 12/1978 | Tsujimoto et al. | 204/157.1 R |
| 4,563,286 | 1/1986 | Johnson et al. | 210/721 |
| 4,655,933 | 4/1987 | Johnson et al. | 204/157.15 |
| 4,834,948 | 5/1989 | Schmiga et al. | 422/186.19 |

FOREIGN PATENT DOCUMENTS

| | | |
|---|---|---|
| 779735 | 9/1934 | France . |
| 48-39391 | 6/1973 | Japan . |
| 54-135692 | 10/1979 | Japan . |
| 56-125207 | 1/1981 | Japan . |
| 63-040705 | 2/1988 | Japan . |

OTHER PUBLICATIONS

9 R. Kirk & D. Othmer, Encyclopedia of Chemical Technology 740–747 (2d edit.) (undated).

Primary Examiner—John Niebling
Assistant Examiner—Brian M. Bolam
Attorney, Agent, or Firm—Arnold, White & Durkee

[57] ABSTRACT

An ozone generator (1) comprises an ultra-violet lamp (2), means (3, 12, 13) for directing a flow of an oxygen containing gas through a zone (16) in which the gas is exposed to ultra-violet radiator emanating from the lamp, and means (8, 9) to expose the gas to a high voltage, low current electric field prior to or during exposure to ultra-violet radiation. Preferably at least one magnet 15 is associated with lamp 2 so that ionized particles within the lamp are concentrated by a magnetic field to congregate in a localized region in the vicinity of the zone (16).

15 Claims, 1 Drawing Sheet

OZONE GENERATOR

FIELD OF THE INVENTION

This invention concerns an ozone generator. In particular the invention concerns an improved ozone generator of the type which employs ultra-violet light irradiation of air.

BACKGROUND OF THE INVENTION

There are two common ways of generating ozone. The first employs an "ozinator discharge", and the second, safer method, employs ultra-violet irradiation of the air.

The "ozinator discharge" method involves applying a high voltage alternating current between two closely spaced parallel plate electrodes separated by a layer of insulation such as glass and an air space. The air space is filled with a diffused purple glow called an "ozinator discharge" if the electrode gap is not more than 2 mm to 3 mm. A high current flows and the formation of ozone is directly proportional to the power dissipated in the discharge at a given temperature. 85% to 95% of the electrical energy applied is dissipated as heat and the amount of power which can be applied is severely limited by cooling arrangements. Efficiency is adversely affected by moisture in the supplied air. Concentric tubular electrodes are preferred and corona or brush discharge is avoided as an inefficient way of generating ozone since, at the short air gaps involved, high voltages arcing would occur.

Ozone is also manufactured photochemically by the action of ultra-violet light of wavelengths shorter than about 2200 Angstrom.

Ultra-violet emitting fluorescent lamps are manufactured for this purpose, but although these lamps may nominally be rated to produce 30 grams of ozone per hour, it has been found impossible in practice to obtain more than about 6 grams per hour due to the inefficient operation of the lamp.

An object of the present invention is to provide an ozone generator which avoids or at least ameliorates disadvantages of the prior art.

DISCLOSURE OF THE INVENTION

According to one aspect the present invention consists in an ozone generator comprising an ultra-violet lamp;

means to direct a flow of an oxygen-containing gas through a zone at which the gas is exposed to ultraviolet radiation emitted from the lamp; and means to pass the gas through a high voltage low current electric field prior to or during exposure to the ultra-violet radiation.

The oxygen-containing gas may, for example, be air or oxygen. The electric field is desirably applied between widely spaced apart (for example 1 meter apart) electrodes under conditions such that substantially no ozone is generated from the electric field alone when the lamp is not energized.

Surprisingly, it has been found that when air is irradiated by ultra-violet light from the lamp in the presence of the same electric field, the rate of ozone Production in preferred embodiments of the invention, is up to ten times greater than the rate of ozone production obtained from the lamp in the absence of the electric field. In preferred embodiments of the invention a plurality of sharpened rod electrodes is positioned at each end of a tube housing an elongate ultra-violet lamp. The plurality of electrodes at on tube end are of opposite polarity to the plurality of electrodes at the other tube end and are spaced apart by from 20 cm to 1 meter or more in distance. An alternating current having a peak potential difference exceeding 5000 volts and preferably 15000 volts is applied between them but current flow is small and no discharge is visible. Air at atmospheric pressure or slightly greater pressure is admitted at each end of the tube adjacent the electrodes, and a mixture of air and ozone exits from the tube at an outlet substantially equidistant from the tube ends.

According to a second aspect the invention consists in apparatus according to the first aspect wherein at least one magnet is associated with the lamp so that ionized particles within the lamp are influenced by a magnetic field to congregate in one or more localized regions whereby to concentrate the ultra-violet radiation emanating from the lamp in the zone through which the gas flows.

It has been found that substantial further improvements in production rate of ozone are obtained when magnets are used in conjunction with the high voltage low current electrical field and ultra-violet lamp. The production efficiency is especially increased when at least two magnets are used with like poles facing each other. Desirably, the magnets are electro-magnets and are energized by a pulsating or alternating current. It is believed that the magnets influence ionized particles in the lamp so as to concentrate ultra-violet radiation and thereby allow a more intense irradiation of the air.

BRIEF DESCRIPTION OF THE DRAWING

The invention will now be described by way of example only with reference to the accompanying drawing, which is a perspective view of an ozone generator embodying the present invention.

PREFERRED EMBODIMENT OF THE INVENTION

Figure 1:
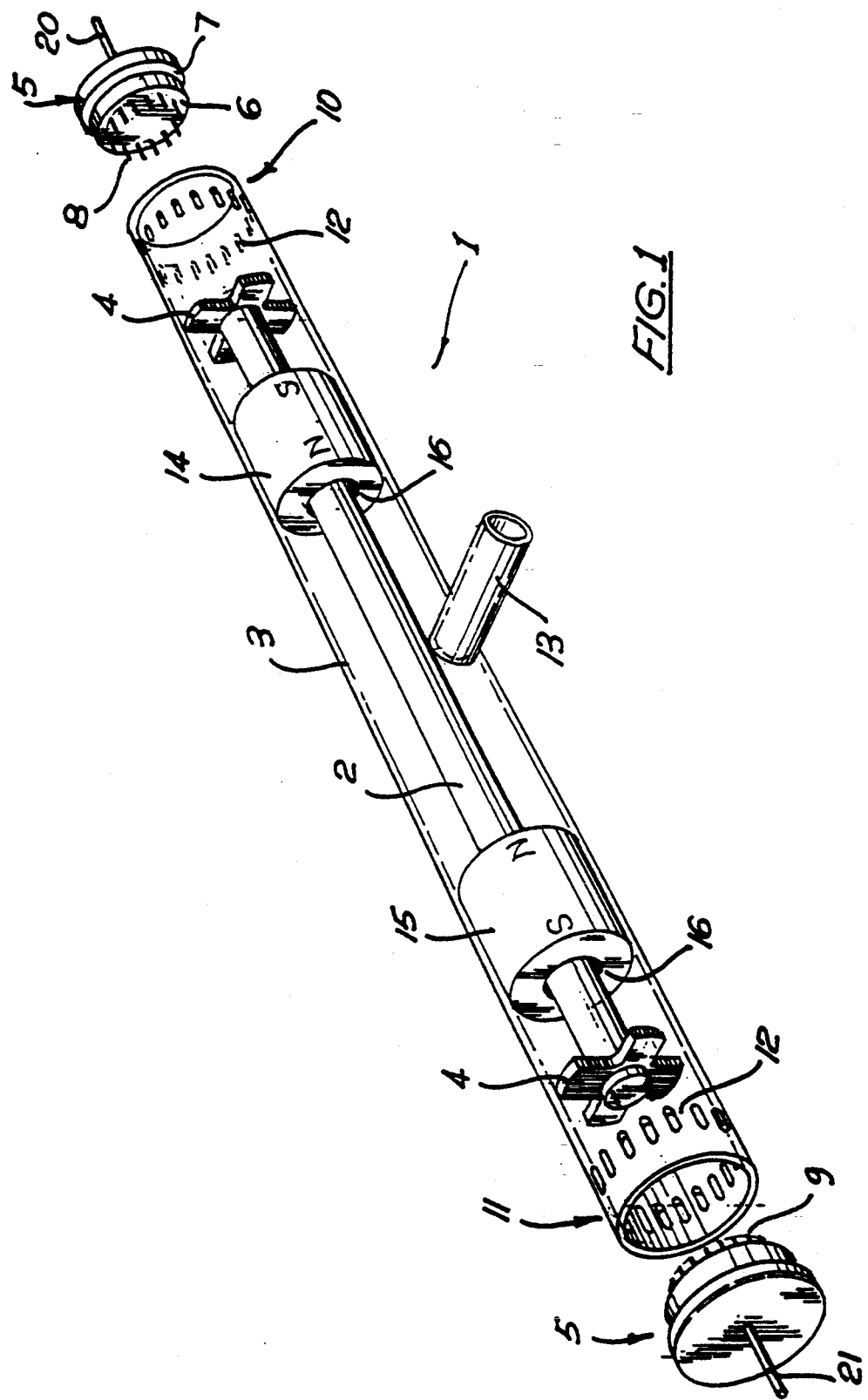

Ozone generator 1 comprises a commercially available elongate quartz tube ultra-violet lamp 2 intended for ozone production. The lamp in the presently described embodiment is a mercury vapour quartz tube of approximately 15 mm diameter and 850 mm length producing ultra-violet radiation of about 900–950 nanometers. Lamp 2 is mounted within a perspex tube 3 by means of two cross-shaped mounting brackets 4, fixed within tube 3 by means of self-tapping screws (not shown). In the described embodiment, tube 3 has a wall thickness of 4 mm, a length of 1 meter and an internal diameter of 100 mm.

At one end 10 of tube 3 there is provided an insulated end cap 5 having a boss 6 and flange 7 and which carries a circular array of electrodes 8 electrically connected to a common terminal 20.

At the other end 11 of tube 3 there is a corresponding end cap 5 which carries a circular array of electrodes 9 electrically connected to a common terminal 21.

The end caps 5 are shown disassembled from tube 3 for clarity in FIG. 1 but when assembled with tube 3 each boss 6 provides a seal with tube 3 and electrodes 8, 9 are then disposed within tube 3 concentrically with respect to the axis of lamp 2 at respective tube ends.

End caps 5 also provide sealed entry for electrical connections (not illustrated) whereby the lamp may be energized, and whereby electromagnets if used may be energized, from an external power supply.

In the presently described embodiment, electrodes 8, 9 are, for example, 2% thoriated tungsten rods 1.2 mm in diameter sharpened to a point and of the kind used for striking an arc in TIG welding apparatus.

In use, a transformer of a kind used to energize neon signs and having a 240 volt primary winding energized from 60 cycle mains and having a 15,000 volt centre tapped secondary winding is used to provide an alternating 60 cycle low current high voltage field between electrodes 8, 9 at opposite ends of tube 3. The centre tap of the transformer is earthed, one side of the secondary winding being connected via terminal 20 to electrodes 8, the other side of the secondary winding being connected via terminal 21 to electrodes 9.

In the preferred embodiment of the invention, the apparatus is further provided, optionally, with magnets 14, 15 which are positioned around portions of lamp 2 adjacent either end.

Magnets 14, 15 may be permanent magnets or electromagnets but desirably are pulsed electromagnets. It has been found that a significant improvement in production rate is obtained when at least two magnets are used and these are disposed with like polarity poles facing each other as illustrated in FIG. 1. The optimum pulse frequency may be determined by simple experiment.

Adjacent each end 10, 11 of tube 3 is a plurality of circumferentially arranged air inlet orifices 12, which may be round, slotted, or any other convenient shape. Intermediate tube ends 10, 11 and preferably approximately equidistant from each tube end, an outlet 13 allows the ozone enriched air to exit the apparatus.

The internal diameter of magnets 14, 15, is made slightly large than the external diameter of lamp 2 so that an air passage 16 is created between the lamp and the magnet. The exterior diameter of magnets 14, 15 is made substantially equal to the interior diameter of tube 3 so that no air can pass over the outside of the magnets.

In use, the ultra-violet tube is energized while air is introduced or drawn into the interior of tube 3 via inlet orifices 12. The high voltage field in the vicinity of electrodes 8, 9 is believed to sensitize or predispose the inflowing air to formation of ozone by ultra-violet irradiation.

In addition, magnets 14, 15, appear to condense the plasma within lamp 2 into those parts of the lamp surrounded by the magnets. Pressurized air passing through air gaps 16 is thereby irradiated with high intensity ultra-violet radiation and ozone is produced in that air very efficiently.

It is surmised that the high voltage field also produces some positive or negative ions which are swept through air gaps 16 under the influence of the magnetic fields associated with magnets 14, 15.

In one series of tests, ozone concentration was measured at outlet 13 by means of a KOMYO KITICHAWA ozone detector.

Test 1

The apparatus was first operated using the ultra violet lamp 2 alone and without application of the high voltage field between electrodes 8, 9. Magnets 15 were not energized. The concentration of ozone in the exit gas was measured at 6 ppm.

Test 2

The apparatus was operated with the high voltage field applied between electrodes 8, 9 and without energizing the ultra-violet lamp 2, and without energizing the magnets 1, 5. No ozone was detected in the exit gas.

Test 3

The apparatus was operated with magnets 15 alone and without energizing lamp 2 or applying high voltage between electrodes 8, 9. No ozone was detected in the exit gas.

Test 4

The apparatus was operated with a high voltage applied between electrodes 8, 9 with magnets 15 energized and with lamp 2 off. No ozone was detected in the exit gas.

Test 5

The apparatus was operated with lamp 2 and with a high voltage applied between electrodes 8, 9. Magnets 15 were not energized. The ozone concentration in the exit air was 64 ppm.

Test 6

The apparatus was operated with lamp 2 on and with magnets 15 energized but without a voltage difference between electrodes 8, 9. The ozone concentration in the exit gas was 20 ppm.

Test 7

The apparatus was operated with lamp 2 on, a high voltage applied between electrodes 8, 9 and with magnets 15 energized. Under these circumstances the ozone concentration in the exit gas was 80 ppm.

The results are summarized in Table I, which shows that lamp 2 when used alone produced about 6 ppm of ozone at a given air flow rate. Neither the high voltage field applied between electrodes 8, 9 nor the magnetic field in the absence of the ultra-violet lamp produced any detectable ozone concentration at the same air flow.

Surprisingly, when a high voltage was applied between electrodes 8, 9 with lamp 2 on, the concentration of ozone produced increased by a factor of 10 while the energy consumption of the apparatus increased by about 20%.

When the electromagnets 14, 15 were energized a further increase of about 20% in ozone production was obtained. Tests 5, 6, 7 in accordance with the invention thus produce superior results to control tests 1, 2, 3 and 4.

TABLE I

| Test | Combination | Indicative Energy Consumption | Ozone concentration in air flow |
|---|---|---|---|
| 1 | UV lamp alone | 90 watts | 6 ppm |
| 2 | High Voltage alone | 17 watts | 0 ppm |
| 3 | Magnets alone | N/A | 0 ppm |
| 4 | High Voltage + Magnets | N/A | 0 ppm |
| 5 | UV Lamp + High voltage | 107 watts | 64 ppm |
| 6 | UV Lamp + Magnets | N/A | 20 ppm |
| 7 | UV Lamp + High voltage + Magnets | — | 80 ppm |

Tube 3 may be of material other than perspex and in fact stainless steel is preferred because of its reflective nature. If stainless steel is used care must be taken to provide proper insulation and isolation of parts.

INDUSTRIAL APPLICATION

In a preferred embodiment of the invention, the ozone from the generator is used for water treatment. For that purpose, the generator of FIG. 1 is enclosed in a stainless steel housing provided with an air intake fan and filters to exclude dust whereby atmospheric air is supplied to the inlet orifices 12 at a positive pressure.

Ozone bearing air is conducted by a stainless steel pipe from outlet 13 to an absorption unit outside the stainless steel housing wherein the ozone is absorbed in water to be treated.

Water decontamination is conveniently carried out in a water sluice unit into which contaminated water is sprayed and ozone pumped. Slanted sluice-screens are provided one above the other within the unit to ensure the flow of water over a large surface area while it is in contact with the ozone-enriched air. A sump collects debris swept into the chamber with the contaminated water. The decontaminated water escapes through a drain in the side of the chamber near the bottom, and a filter on the water outlet ensures that any debris entrained in the water stream is deflected back into the sump.

In comparison with prior art the present invention provides a simple, safe and efficient means of generating ozone.

I claim:

1. An ozone generator comprising an ultraviolet lamp; means to direct a flow of an oxygen-containing gas through a zone at which the gas is exposed to ultraviolet radiation emanating from the lamp; and
    means to expose the gas to a voltage exceeding 5000 volts and to a low current, electric field at which there is no visible discharge, prior to or during exposure to the ultraviolet radiation.
2. Apparatus according to claim 1 comprising a housing surrounding the lamp, the housing having a gas inlet and a gas outlet whereby a gas admitted at the inlet is exposed to ultraviolet radiation in a zone between the inlet and the outlet,
    and at least two spaced apart electrodes between which a high electric potential difference is applied.
3. Apparatus according to claim 1 wherein the lamp is elongate and the housing tubular, the zone extending between the lamp and the housing.
4. Apparatus according to claim 2 wherein the inlet is at or adjacent one of the electrodes.
5. Apparatus according to claim 2 wherein the outlet is intermediate said two spaced apart electrodes.
6. Apparatus according to claim 2 wherein the electrodes are spaced more than 20 cm apart.
7. Apparatus according to claim 2 wherein the voltage between the electrodes exceeds 15000 Volts.
8. Apparatus according to claim 2 wherein said electrodes are rod electrodes.
9. An ozone generator comprising an ultraviolet lamp; means to direct a flow of an oxygen-containing gas through a zone at which the gas is exposed to ultraviolet radiation emanating from the lamp; means to expose the gas to a voltage exceeding 5000 volts and to a low current electric field at which there is no visible discharge, prior to or during exposure to the ultraviolet radiation; and at least one magnet associated with the lamp such that, in use, ionized particles within the lamp are influenced by a magnetic field to congregate in one or more localized regions whereby to concentrate ultraviolet radiation emanating from the lamp in the zone.
10. Apparatus according to claim 9 wherein the magnet is one of a pair of magnets disposed with the like poles facing one another.
11. Apparatus according to claim 9 wherein the magnet is spaced from the exterior of the lamp by a gap and the magnet concentrates ultra-violet radiation in the gap so that air passing through the gap experiences a high intensity of radiation.
12. Apparatus according to claim 9 wherein the magnet is torroidal and surrounds a portion of the lamp being spaced from the lamp by an annular gap.
13. A method for generating ozone comprising the steps of:
    directing a flow of an oxygen-containing gas through a zone at which the gas is exposed to ultraviolet radiation emanating from an ultra-violet lamp; and
    exposing the gas to a voltage exceeding 5000 volts and to a low current electric field at which there is no visible discharge, prior to or during exposure to the ultraviolet radiation.
14. A method according to claim 13 wherein the electric field is provided by electrodes spaced more than 20 cm apart.
15. A method according to claim 14 further including the steps of subjecting ionized particles within the lamp to a magnetic field effective to congregate the ions in one or more localized regions whereby to concentrate the ultra-violet radiation emanating from the lamp in a zone, and directing the gas through the zone.

* * * * *